April 11, 1939. H. F. HAGEMEYER Re. 21,046

APPARATUS FOR PRODUCING MOLDS

Original Filed June 29, 1936 2 Sheets-Sheet 1

Inventor:
Henry F. Hagemeyer,
By: Zabel, Carlson & Wells
Attorneys.

April 11, 1939. H. F. HAGEMEYER Re. 21,046

APPARATUS FOR PRODUCING MOLDS

Original Filed June 29, 1936 2 Sheets-Sheet 2

Inventor:
Henry F. Hagemeyer,
By Zabel, Carlson & Wells
Attorneys.

Reissued Apr. 11, 1939

Re. 21,046

UNITED STATES PATENT OFFICE 21,046

APPARATUS FOR PRODUCING MOLDS

Henry F. Hagemeyer, Chicago, Ill., assignor to Castings Patent Corporation, Chicago, Ill., a corporation of Illinois Original No. 2,101,677, dated December 7, 1937, Serial No. 87,923, June 29, 1936. Application for reissue April 27, 1938, Serial No. 204,694

14 Claims. (Cl. 22—190)

The invention relates to molding apparatus and is particularly adapted to be embodied in apparatus for producing molds comprising calcined gypsum and asbestos pulp.

In the production of molds of the kind described, a flask of improved construction is preferably placed upon a match plate on which the pattern is formed or secured. The material from which the mold is formed may be of any suitable proportions. It has been found that excellent results may be obtained by employing one hundred parts of molding material and one hundred and sixty parts of water, these proportions being computed by weight. The molding material preferably comprises eighty percent (80%) by weight of calcined gypsum and twenty percent (20%) of asbestos pulp. After the water and molding material are placed in the flask it is necessary to agitate the molding material and the water violently so that a homogeneous mixture will be obtained. The agitation must be such that the mixture is churned and impacted against the match plate and the pattern. After the molding mixture has been violently agitated in the manner described, the molding material is permitted to set. The mold is then withdrawn from the flask by means embodying the present invention, the mold being then subjected to a drying operation before any molten metal is poured into it. Fused metal at relatively high temperatures may be poured in the molds and the resulting castings will be found to be extremely perfect in configuration. It may be mentioned that the gases attending the pouring operation vent through the molding material which is extremely porous when dry.

As indicated above, the present invention relates to apparatus for withdrawing the molds from the flask. The apparatus, in its preferred form, includes means for subjecting one side of the mold to a partial vacuum so that the differential in pressures on opposite sides of the mold cause it to be displaced relative to the flask and the match plate. This method of withdrawing the mold from the flask is exceedingly advantageous as the molds are not broken or otherwise deformed.

As stated, the mold is withdrawn from the flask and match plate before it is dried. At this stage of the process, while the material is necessarily somewhat set, it is still quite soft and can be easily deformed or injured.

My main object is therefore to withdraw such a soft mold from the flask and match plate without warpage, fracture, or other injury of the mold.

It is a further object to effect separation of the mold from the mold form by the use of differential fluid pressures acting on opposite sides thereof.

Still another object is to withdraw the mold both from the flask and the match plate in a single operation, and preferably to perform such operation with the flask and match plate in the inverted position to allow easier handling of the mold, and to reduce the differential pressure required to a minimum.

Other objects and advantages of the present invention will appear as the following detailed description progresses, reference being had to the accompanying drawings.

I prefer, as will be described in detail hereafter, to withdraw the mold from the flask and match plate simultaneously, such flask and match plate being secured together to form an integral unit. It will be appreciated, however, that my method and the operative principles embodied in my preferred apparatus illustrated and particularly described may be employed either to separate the mold from the match plate alone or from the flask alone as well as from both at once. The flask and the match plate are both mold forms, and hence the term mold form will be used in this specification in a generic sense to designate either a match plate, or a flask, or both match plate and flask, or equivalent structure.

Figure 1:
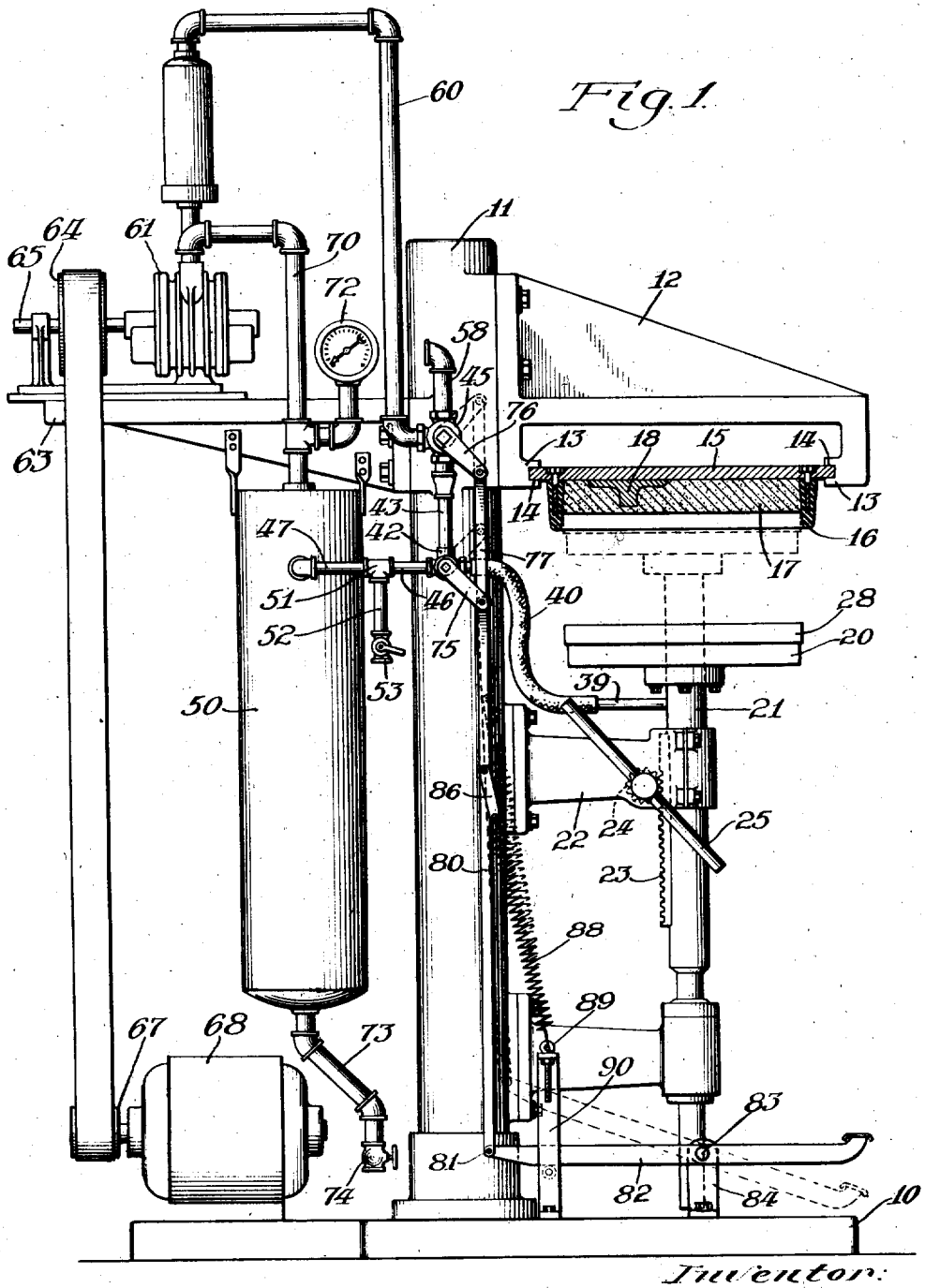
Fig. 1 is a side elevation of apparatus embodying the invention, a match plate, a flask and a mold being shown in cross-section to illustrate the operation of the apparatus.

Referring to the drawings wherein a preferred embodiment of the invention is illustrated, the reference character 10 designates a base plate adapted to rest upon any suitable support such as the floor of a factory (Fig. 1). Projecting upwardly from the base plate 10 and secured thereto is a post 11 to which a bracket 12 is bolted. The bracket 12 is provided with lugs 13 having grooves 14 adapted to receive the ends of a match plate 15. Any desired alternative form of flask and match plate holder or support may, of course, replace such bracket and lugs. Detachably secured to the match plate 15 is a flask 16 and disposed within the match plate 15 is a mold 17 abutting against the bottom surface of the match plate 15. It will be noted that the match plate 15 is provided with a pattern 18. The construction of the match plate 15 and the flask 16 is described in detail in my co-pending application, Serial No. 87,922, filed June 29, 1936.

Disposed beneath the bracket 12 and aligned with the mold 17 is a suction plate or cover 20 secured to the upper end of a vertically disposed rod or plunger 21 which is slidably journaled in a bearing 22 secured to the post 11. A rack 23 fixed to the plunger 21 meshes with a pinion 24 which may be rotated manually through the medium of a handle 25. It will be readily understood that if the handle 25 is rotated in a clockwise direction (Fig. 1) the suction plate 20 and the plunger 21 will be lowered and that if the handle 25 is rotated in the opposite direction, the suction plate 20 and the plunger 21 will be elevated. Obviously, the suction plate 20 may be elevated until its upper surface abuts against the bottom surface of the mold 17.

Figure 2:
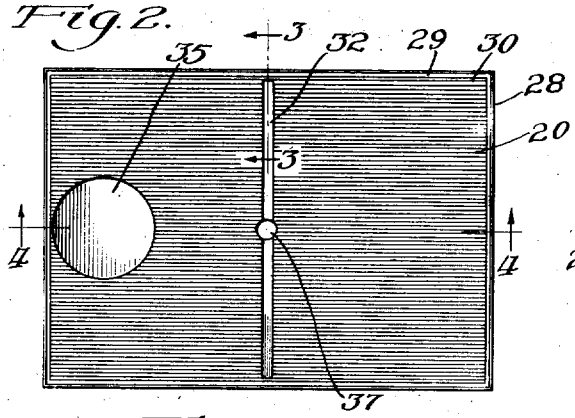
Fig. 2 is a top plan view of a suction plate which is utilized to subject one side of a mold to a partial vacuum.
Figure 3:
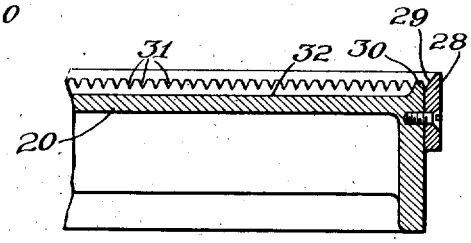
Fig. 3 is an enlarged fragmentary section taken on line 3—3 of Fig. 2.
Figure 4:
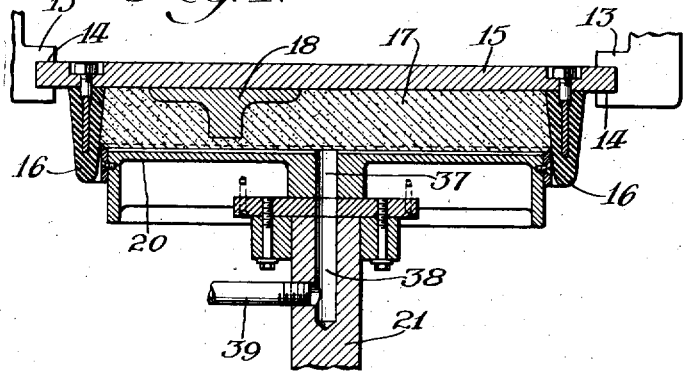
Fig. 4 is a section taken on line 4—4 of Fig. 2, a mold, a flask and a match plate being shown in connection with the suction plate.
Figure 6:
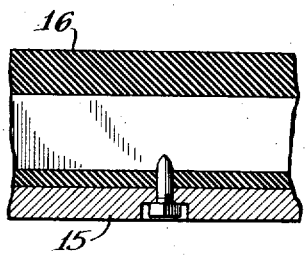
Fig. 6 is a section taken on line 6—6 of Fig. 5.
Figure 5:
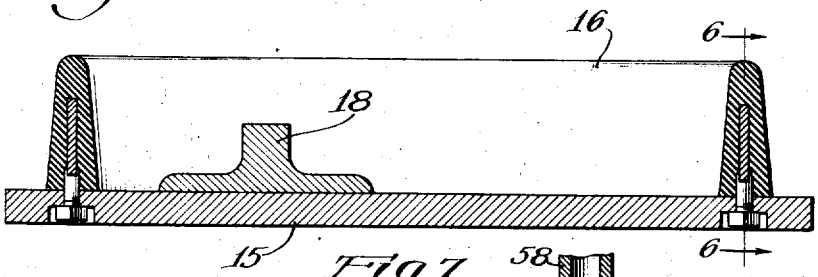
Fig. 5 is a vertical section taken through an improved flask and match plate.
Figure 7:
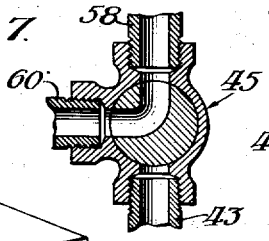
Fig. 7 is a section taken through a valve which forms part of the improved apparatus.
Figure 8:
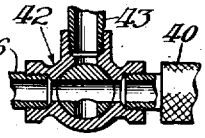
Fig. 8 is a section taken through another valve which also forms part of the improved apparatus.
Figure 9:
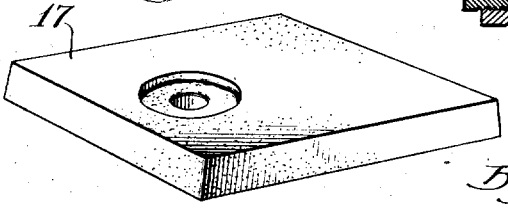
Fig. 9 is a perspective view of a mold which has been withdrawn from the improved flask.

As best shown in Figs. 2, 3 and 4, the suction plate 20 has a rectangular member 28 disposed around it, the rectangular member 28 having a beveled surface 29 at its upper edge. The suction plate 20 is provided with an integral rib 30 extending around it, the rib 30 being adjacent the beveled surface 29 of the member 28. This rib 30 is sufficiently sharp to penetrate the surface of the soft mold, which may be slightly irregular, enough to effect a vacuum seal about the central portion of the plate, as will be explained more fully hereafter.

Upstanding from the surface of the plate are closely spaced mold engaging projections with depressions interposed therebetween. In the preferred form shown, these projections are arranged as a plurality of ribs extending lengthwise of the suction plate and alternating with grooves 31 which open into a deeper groove 32 cut into the upper face of the suction plate 20. It will be noted that the grooves 32 extend substantially the entire distance between oppositely disposed parts of the sealing rib 30. The upper surface of the suction plate 20 is preferably provided with a recess or depression 35 which is preferably deeper than the grooves 31, and which may receive the upper end of a conventional sprue forming projection upstanding from the match plate (not shown) of the cope mold section, and which extends entirely through or almost through the mold section. In the case illustrated the sprue would be formed in the other complemental mold section not illustrated. The groove 32 opens into a bore 37 in the suction plate 20. The bore 37 communicates with a bore 38 in the upper end of the plunger 21 and the bore 38 communicates, in turn, through a pipe 39 with one end of a flexible hose 40. The other end of the flexible hose 40 communicates with one opening of a three-way valve 42. Another opening of the valve 42 communicates through a pipe 43 with an opening in a three-way valve 45. The remaining opening of the valve 42 communicates through pipes 46 and 47 to a tank 50. Disposed between the pipes 46 and 47 and forming a passage from one to the other is a T-fitting 51 from which a pipe 52 extends downwardly. At the lower end of the pipe 52, a valve 53 is provided. The purpose of this construction will presently appear.

As stated above, one opening of the valve 45 communicates with the pipe 43. A second opening of the valve 45 communicates with the atmosphere through a pipe 58. The third opening of the valve 45 communicates through pipe 60 with the discharge port of a vacuum pump 61 which is mounted on a bracket 63 secured to the post 11. The vacuum pump 61 is driven by means comprising a pulley 64 fixed on a shaft 65 which forms part of the vacuum pump. A belt trained over the pulley is also trained over a pulley 67 mounted on the shaft of an electric motor 68 which is mounted on the base plate 10. The inlet port of the vacuum pump 61 is connected through a pipe 70 with the tank 50. A vacuum gauge 72 communicates with the pipe 70 and indicates the pressure obtaining within the tank 50. A pipe 73 which communicates with the tank 50 at its lower end is provided with a valve 74 which may be opened so that any liquid in the tank 50 may be drained therefrom. The three-way valves 42 and 45 are provided with valve handles 75 and 76, respectively, the free ends of the handles 75 and 76 being pivotally connected to a link 77. Pivoted to the free end of the valve lever 75 is a second link 80 which is also pivotally connected by a pivot pin 81 to one end of a foot treadle 82 which is pivoted intermediate its ends on a pin 83 projecting from a bracket 84. The bracket 84 is fixed to the base 10. Pivoted to the link 80 intermediate its ends is a small link 86 which has one end of a tension spring 88 secured to it, the other end of the tension spring 88 being secured to an eye bolt 89 which is screw-threaded in a bracket 90 mounted on the base 10. The spring 88 normally holds the valve levers or handles 75 and 76, the link 77, the link 80 and the foot treadle 82 in the positions wherein they are shown in full lines in Fig. 1. However, if the operator steps upon the outer end of the foot treadle 82 and displaces it into the position wherein it is shown in dotted lines in Fig. 1, the links 77 and 80 will cooperate to displace the valve handles 75 and 76 into the positions wherein they are shown in dotted lines in Fig. 1. This displacement is against the action of the spring 88.

The operation of the above described apparatus is substantially as follows: It is assumed that the mold 17 has been formed by practicing the method described in my co-pending application, Serial No. 87,922, filed June 29, 1936, and that it has not been subjected to the drying operation described in my co-pending application, Serial No. 91,897, filed July 22, 1936. However, the mold has been permitted to set and the match plate 15 has been inserted in the grooves 14 as illustrated in Figs. 1 and 4. The foot treadle 82 and the valve handles 75 and 76 are in the positions wherein they are shown in full lines in Fig. 1. The pipe 60 then communicates with the atmosphere through the valve 45 and the pipe 58 but is adjusted so that the pipes 60 and 58 do not communicate with the pipe 43. The tank 50 communicates with the flexible hose 40 through the pipes 47 and 46, the T-fitting 51 and the valve 42. The valve 42 is then adjusted so that the pipe 46 and the flexible hose 40 do not communicate with the pipe 43. The valve 53 has been adjusted so that some air may flow through it and the pipes 52 and 47 to the tank 50. It should be understood that the valve 53 may be adjusted to control the minimum pressure that will obtain in the tank 50 when the vacuum pump 61 is in operation.

Assuming that the vacuum pump 61 is in operation and that the mold 17 is in the position wherein it is shown in full lines in Fig. 1, the operator manipulates the handle 25 to bring the suction plate 20 into contact with the mold 17 (Fig. 4). Sufficient pressure is exerted so that the sealing rib 30 on the plate 20 will be engaged firmly and contiguously over its entire perimetral length with the soft mold surface, and because of the presence of slight irregularities the rib 30 will be made to penetrate slightly or to indent the surface of the mold to insure a tight vacuum seal. A partial vacuum will be established immediately between the upper surface of the suction plate 20 and the adjacent surface of the mold 17. The entire bottom surface of the mold 17 will be subjected to this partial vacuum as air will be exhausted through the grooves 31 and 32 and the bore 37.

As the differential pressure is created on the opposite sides of the mold the soft material will be forced against the plate 20. The projections upstanding from this plate, herein illustrated in the form of parallel ribs alternating with the grooves 31, will support the back surface of the mold over distributed, closely spaced areas so that the soft mold will not be buckled or fractured nor will pieces of the mold be broken off. If such mold supporting engagement were not provided by the projections, the soft mold would be bowed into the vacuum space on the plate 20 and the material would be squeezed against its surface to fill the vacuum cavity. The projections or ribs will be slightly embedded in the mold surface by pressure of such surface thereagainst, but they are spaced closely enough so that the mold material will have sufficiently distributed support to prevent mold material entering or clogging the grooves 31 to any appreciable extent, and a substantially uniform vacuum or differential pressure can therefore be maintained throughout the grooves.

The operator will then manipulate the handle 25 to lower the suction plate 20 and the mold 17 will follow the suction plate as a result of the differential in pressures obtaining between the upper and lower surfaces of the mold. As soon as the suction plate 20 has been lowered sufficiently to permit the operator to handle the mold without bringing it into contact with the flask 16, the operator steps upon the foot treadle 82 so that the valve handles 75 and 76 move into the positions wherein they are shown in dotted lines in Fig. 1. The pipe 60 then communicates with the pipe 43 and the flexible hose 40 through the valves 45 and 42 but the valve 45 is then adjusted so that the pipe 60 does not communicate with the pipe 58. The valve 42 is then adjusted so that the pipe 46 does not communicate with the pipe 43 or the flexible hose 40. Obviously, the exhaust opening from the vacuum pump 61 is then connected to the bore 37 and the grooves 31 and 32 through the pipe 60, the valve 45, the pipe 43, the valve 42, the flexible hose 40 the pipe 39 and the bore 38 so that the partial vacuum between the suction plate 20 and the mold 17 is broken and a pressure above atmospheric pressure is applied to force the mold away from the projections or ribs which were forced against and slightly embedded in the mold surface. The operator may then remove the mold 17 from the suction plate 20 with little effort and without danger of part of the soft mold adhering to the plate 20 and being broken from the mold proper, and he may then place it in the drying apparatus. Meanwhile, the operator has released the foot treadle 82 to restore the apparatus to its original condition so that the above described cycle of operations may be repeated.

During the operation of subjecting the mold 17 to a partial vacuum through the medium of the suction plate 20, some water is withdrawn from the soft, moist mold 17. This water passes into the tank 50 through the flexible hose 40, the valve 42 and the pipes 46 and 47. After an undesirable amount of water has collected in the tank 50, it may be drained therefrom by opening the valve 74.

While I have shown and described certain embodiments of my invention, it is to be understood that it is capable of many modifications. Changes therefrom, in the construction and arrangement may be made without departing from the spirit and scope of the invention as disclosed in the appended claims, in which it is my intention to claim all novelty inherent in my invention as broadly as permissible, in view of the prior art.

I claim as my invention:

1. Apparatus for withdrawing a mold from a mold form, which apparatus comprises means for holding the mold form, a plate having a plurality of closely spaced projections distributed over its surface and engageable with a surface of the mold, sealing means encircling said plate and adapted to seat tightly against such mold surface, means for exhausting gas from the spaces on the mold-engaging surface of said plate between said projections, whereby a partial vacuum will be formed over the plate engaged surface of the mold and the mold will adhere to said plate and will be pressed against and be supported by said projections against distortion or disruption by pressure on the side of the mold opposite said plate and means for separating said plate and said mold form.

2. Apparatus for withdrawing a mold from a mold form, which comprises means for supporting the mold form, a plate having a plurality of upstanding projections and interposed grooves, said projections being engageable with a surface of the mold, means carried by said plate for forming an air tight seal with the engaged mold surface around the grooved portion of the plate, means for exhausting gas from said grooves to partially evacuate them, whereby the mold will adhere to said plate when said plate and said mold form are displaced relative to each other, and means for relatively separating said grooved plate and the mold form.

3. Apparatus for withdrawing a mold from a mold form which comprises means for supporting the mold form with an exposed mold surface facing downward, means for producing differential fluid pressures on opposite surfaces of the mold, the higher pressure being on the upper mold surface, whereby the mold and mold form may be separated, and a ribbed member beneath said supporting means and exposed mold surface and engageable with such exposed mold surface to support it against distortion and disruption by such differential pressures.

4. An apparatus for withdrawing a mold from a mold form, which apparatus comprises means for supporting the mold form, a plate having a surface bounded by a rib extending around said plate, said rib being adapted for sealing engagement with a surface of the mold, means for partially evacuating the space bounded by said rib between said surface of said plate and said surface of the mold, whereby the mold will adhere to said plate when it and the mold form are displaced relative to each other, and means for relatively separating said plate and the mold form.

5. An apparatus for withdrawing a soft mold from a mold form, which comprises means for supporting the mold form, a plate having an endless, rigid rib integral with and upstanding from the surface thereof adapted to penetrate a surface of the soft mold sufficiently to effect a continuous sealing engagement therewith, means for partially evacuating the space bounded by said rib between said surface of said plate and said surface of the mold, whereby the mold will adhere to said plate when it and the mold form are displaced relative to each other and means for relatively separating said plate and the mold form.

6. An apparatus for withdrawing a mold from a match plate and a flask, which apparatus comprises means for supporting the match plate and the flask, a second plate having a grooved surface bounded by a rib extending around said plate, said rib being adapted for sealing engagement with a surface of said mold, means for partially evacuating said grooves between said surface of said second plate and said surface of said mold, whereby said mold will adhere to said second plate when said second plate and said match plate are displaced relative to each other, and means for causing relative displacement between said match plate and said second plate.

7. Apparatus for engaging the back of a mold, comprising a plate having a plurality of projections distributed over one surface thereof engageable with the mold back, with depressions therebetween, said projections including a sealing rib engageable in air-tight contact with portions of the mold back completely surrounding a depression, and means for exhausting gas from such sealed depression while the mold back is engaged by said projections, for creating a partial vacuum within such sealed depression.

8. Apparatus for engaging the back of a mold, comprising a plate having on one side thereof a plurality of substantially parallel integral ribs with grooves interposed therebetween, each marginal rib being adapted for sealing engagement with the mold back, sealing means engageable with the mold back for sealing the groove ends, and means for exhausting gas from the grooves, for creating a partial vacuum therein when said ribs and said sealing means are engaged with the mold back.

9. Apparatus for withdrawing a mold from a mold form including a patern, which comprises means having a plurality of closely spaced projections distributed over its surface and engageable with that face of the mold opposite the pattern, and means to act upon the face of the mold with which said first means is engageable for producing a lower fluid pressure on such mold face than on the mold face engaged by the pattern, said first means operating to support the mold against distortion and disruption when the mold is subjected to such differential fluid pressures.

10. The method of making a mold for casting purposes by the use of a container composed of a match plate having a pattern thereon and an open topped flask rim upstanding from such match plate and surrounding the pattern, which comprises filling such container with molding material to a level below the upper edge of the flask rim, and then, while holding the match plate and flask rim against movement relative to each other, simultaneously withdrawing the mold from contiguous engagement with the match plate and pattern and shearing its sides from the flask rim.

11. The method of withdrawing a soft mold for casting purposes from a mold form including a match plate having a pattern thereon, which comprises holding the mold form, subjecting the mold to differential fluid pressures on opposite sides thereof, thereby displacing the mold relative to the mold form away from the molds higher pressure side and withdrawing the pattern from the mold, and, during subjection of the mold to such differential fluid pressures, supporting the side thereof exposed to the lower pressure by engagement sufficiently distributed over such side to prevent buckling of the mold and appreciable displacement of the soft mold material.

12. The method of withdrawing a soft mold for casting purposes from a mold form including a match plate having a pattern thereon, which comprises holding the mold form, gripping the soft mold by creation of a partial vacuum on that face thereof opposite the pattern, engaging closely spaced areas of the mold face thus gripped distributed over substantially the entire region of vacuum application, thereby supporting the soft mold against buckling and displacement of mold material therefrom, and, while thus holding the mold form and gripping the mold, separating the mold from contiguous engagement with the mold form and thereby withdrawing the pattern from the mold.

13. The method of withdrawing a soft mold for casting purposes from a mold form including a match plate having a pattern thereon, which comprises holding the mold form, gripping the soft mold by creation of a partial vacuum on that face thereof opposite the pattern, engaging the mold face thus gripped throughout the lengths of closely spaced parallel lines distributed over substantially the entire region of vaccum application, thereby supporting the soft mold against buckling and displacement of mold material therefrom, and while thus holding the mold form and gripping the mold, separating the mold from contiguous engagement with the mold form and thereby withdrawing the pattern from the mold.

14. The method of withdrawing a soft mold for casting purposes from a mold form including a match plate having a pattern thereon, which comprises holding the mold form, engaging with closely spaced projections that face of the soft mold opposite the match plate and pattern, subjecting the mold to differential fluid pressures on opposite sides thereof, the higher pressure being exerted against the match plate and pattern engaged face of the mold, thereby forcing the mold material against and somewhat around the projections, displacing the mold relative to the mold form and thereby withdrawing the pattern from the mold, and thereafter subjecting such opposite sides of the mold to reverse differential pressure, thereby forcing the soft mold material away from the projections.

HENRY F. HAGEMEYER.